United States Patent
Arlitt et al.

(10) Patent No.: US 7,349,902 B1
(45) Date of Patent: Mar. 25, 2008

(54) CONTENT CONSISTENCY IN A DATA ACCESS NETWORK SYSTEM

(75) Inventors: Martin F. Arlitt, Palo Alto, CA (US); John A. Dilley, Los Altos, CA (US); Richard J. Friedrich, San Jose, CA (US); Tai Y. Jin, San Mateo, CA (US); Stephane J Perret, Grenoble (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 787 days.

(21) Appl. No.: 09/368,635

(22) Filed: Aug. 4, 1999

(51) Int. Cl.
*G06F 17/30* (2006.01)

(52) U.S. Cl. ................. 707/8; 707/9; 707/10; 707/201; 709/217; 709/248

(58) Field of Classification Search ................. 709/201, 709/216, 219, 226, 235, 217, 248; 711/124; 707/1–10, 100–104.1, 200–206
See application file for complete search history.

(56) References Cited

U.S. PATENT DOCUMENTS

| | | | |
|---|---|---|---|
| 5,734,898 A * | 3/1998 | He .............................. | 707/203 |
| 5,787,470 A * | 7/1998 | DeSimone et al. ......... | 711/124 |
| 5,944,780 A * | 8/1999 | Chase et al. ................ | 709/201 |
| 6,012,126 A * | 1/2000 | Aggarwal et al. .......... | 709/203 |
| 6,038,601 A * | 3/2000 | Lambert et al. ............ | 709/226 |
| 6,128,648 A * | 10/2000 | Chen et al. .................. | 709/213 |
| 6,205,481 B1 * | 3/2001 | Heddaya et al. ............ | 709/226 |
| 6,212,565 B1 * | 4/2001 | Gupta ......................... | 709/229 |
| 6,219,676 B1 * | 4/2001 | Reiner ......................... | 707/201 |
| 6,256,747 B1 * | 7/2001 | Inohara et al. .................. | 714/4 |
| 6,260,061 B1 * | 7/2001 | Krishnan et al. ........... | 709/213 |
| 6,263,369 B1 * | 7/2001 | Sitaraman et al. .......... | 709/225 |
| 6,272,598 B1 * | 8/2001 | Arlitt et al. .................. | 711/133 |
| 6,324,565 B1 * | 11/2001 | Holt, III ..................... | 709/203 |
| 6,377,991 B1 * | 4/2002 | Smith et al. ................. | 709/226 |
| 6,438,576 B1 * | 8/2002 | Huang et al. ............... | 709/202 |
| 2001/0002900 A1 * | 6/2001 | Romrell ....................... | 371/216 |

\* cited by examiner

*Primary Examiner*—Isaac Woo

(57) ABSTRACT

A data access network system is described that includes a content server coupled to a plurality of proxy servers via an interconnect network. The content server store at least one content file. The data access network system also includes a system of maintaining content consistency between the content server and the proxy servers. The system includes a subscription manager in the content server that specifies all of the proxy servers that are subscribed to the content file. The system also includes a consistency manager that notifies all of the subscribed proxy servers that cache the content file to discard the cached content file from those proxy servers when the content file is updated in the content server. A method of maintaining content consistency between the content server and the proxy servers is also described.

35 Claims, 4 Drawing Sheets

CONTENT CONSISTENCY IN A DATA ACCESS NETWORK SYSTEM

BACKGROUND OF THE INVENTION

1. Field of the Invention

The present invention pertains to data access network systems (e.g., Internet or intranet systems). More particularly, this invention relates to improving content consistency between a proxy server and a content server in a data access network system in a cost effective manner and with minimal network data traffic.

2. Description of the Related Art

An example of a data access network system is the Internet or an intranet network system. An Internet/intranet network system typically includes a number of data service systems and Internet Service Provider (ISP) systems connected together via interconnect networks. The data service systems typically include web content servers that host content for various customers or applications. The customers are the owners of the content hosted in the data service systems such that subscribers or users can access the content via their computer terminals via the ISP systems. The content owners are typically referred to as Content Providers. The data service systems may also be referred to as content servers. The content servers typically utilize Internet applications, such as electronic mail, bulletin boards, news groups, and World Wide Web access. The hosted content is arranged in the form of content sites within the content servers. Each site may include a number of pages (e.g., World Wide Web pages).

Access to the web pages by the users via their terminals is typically accomplished using the HTTP (Hyper Text Transfer Protocol) protocol. The HTTP protocol is a request-and-response protocol. When a user at a terminal (e.g., a personal computer) designates a particular web page, at least one request is generated. The actual number of requests is dependent upon characteristics of the designated web page. A web page may include one or more "objects" or files. A multi-object page can be more aesthetically pleasing than a plain page, but each object requires a separate request by the browser and a separate to response by a server.

The total time to download a Web page or other Internet document (e.g., an FTP file) depends on a number of factors, including the transmission speeds of communication links between a user terminal and a server on which the requested file is stored (i.e., content server), delays that are incurred at the server in accessing the document, and delays incurred at any intermediate device located between the user terminal and the content server, including the data access network. In addition, whenever a Web page or file is again requested by the same user terminal at a later time, the same download process may be repeated, which creates unnecessary and redundant network traffic in the data access network system.

To reduce delay and network traffic, proxy servers are provided in the intermediate devices between the user terminals and the content servers to temporarily cache Web page files. This prior art arrangement is shown in FIG. 1. An important benefit of employing the proxy server is the ability to cache objects received from the remote content servers. This allows the cached objects to be quickly retrieved and sent to the client device if objects are again requested. Some of the cached objects may be requested by the same or different client device at later times.

As can be seen from FIG. 1, when a user terminal 12 generates a request for a particular object (e.g., the object 10 stored in the remote server 18), the cache of the proxy server 16 in the local server 14 is searched to determine whether the object 10 is stored at the proxy server 16. If the object is not found in the cache of the proxy server 16, a "cache miss" results and the local server 14 directs the request to the remote server 18 via the Internet 20.

As can be seen from FIG. 1, the remote server 18 stores the requested object 10. Once the remote server 18 receives the request, it directs a response with the requested object 10 to the client device 12 via the local server 14. During this process, the requested object 10 is also cached in the proxy server 16 of the local server 14. This eliminates the need for the local server 14 to send another request to the remote server 18 for the same object 10 at a later time when either the same client device 12 or a different client device (not shown) requests the same object 10. When the object 10 is again requested, the proxy server 16 is accessed and a "cache hit" results. In this case, the cached object 10 is quickly forwarded to the client device directly from the proxy server 16. This eliminates delays encountered in communicating between the proxy server 16 and the remote server 18. By storing copies of objects received from remote sites, the proxy server 16 reduces the number of requests that are directed to the remote server 18, as well as the traffic on the Internet 20 as a result of transmitting the responses in the form of a number of packets that must be reassembled at the client device 12. Caching can delay the need to provide additional network resources, reduce peak demand on the network link from an ISP to the external Internet, and improve client response time. These factors lead to lower ongoing operating costs and increased user satisfaction.

However, disadvantages are associated with this prior art caching arrangement. One disadvantage is that the prior art caching arrangement lacks content consistency between the contents stored in the proxy server and that stored in the content server. This means that if the content of an object or file stored in the content server is updated or otherwise changed, that change is not propagated to the proxy server that caches the same object. The proxy server has no way of knowing whether the content stored in the proxy server is consistent without querying the original content server. In this case, the cached and un-updated object from the proxy server, not the updated object from the remote content server, is retrieved by the user from the proxy cache when the object is requested.

One prior art solution to this problem is to have the proxy server check the remote content server every time the proxy server is accessed. By doing so, the proxy server can assure that it serves consistent data to the users. This, however, comes at the cost of additional round trip connections to the origin content servers, which adds considerable delay to the servicing of the user requests. It also increases network traffic and the workload of the original content servers. This solution basically defeats many of the benefits of providing the proxy servers.

Another prior art solution to this problem is to only cache an object in the proxy server for a predetermined time period. Within that time period, the proxy server serves every request for that object locally from its cache without contacting the remote content server. After the time period has lapsed, the proxy server evicts the object from its cache. One disadvantage of this approach is that there is no content consistency assurance during the time period the object is cached in the proxy server because the object may be updated or changed during that time period. Another disadvantage is that after the time period, the object may still be the same even if it is evicted from the proxy server. This clearly will increase the network traffic when the same object is again requested.

SUMMARY OF THE INVENTION

One feature of the present invention is to improve performance of a data access network system. Another feature is to improve performance of a web origin server. Another is to reduce user response time.

Another feature of the present invention is to improve performance of a data access network system by maintaining content consistency between proxy server and content server.

A further feature of the present invention is to improve performance of a data access network system by maintaining content consistency between proxy server and content server with minimized network traffic.

A still further feature of the present invention is to reduce number of network connections to an origin by using a server-based content invalidation protocol.

A data access network system is described that includes a content server coupled to a plurality of proxy servers via an interconnect network. The content server stores a set of content files. The data access network system also includes a system of maintaining content consistency between the content server and the proxy servers. The system includes a subscription manager in the content server that specifies all of the proxy servers that are subscribed to one of the content files. The system also includes a consistency manager that notifies all of the proxy servers that are subscribed to the content file to discard the cached content file from those proxy servers when the content file is updated in the content server.

In addition, a method of maintaining content consistency between the content server and the proxy servers is also described. The method includes the step of maintaining a subscription list for a content file in the content server that specifies all of the proxy servers that are subscribed to the content file. The method also includes the step of notifying, based on the subscription list, all of the proxy servers that are subscribed to the content file to discard the cached content file from those proxy servers when the content file is updated in the content server.

Other features and advantages of the present invention will become apparent from the following detailed description, taken in conjunction with the accompanying drawings, illustrating by way of example the principles of the invention.

DETAILED DESCRIPTION OF THE INVENTION

Figure 1:
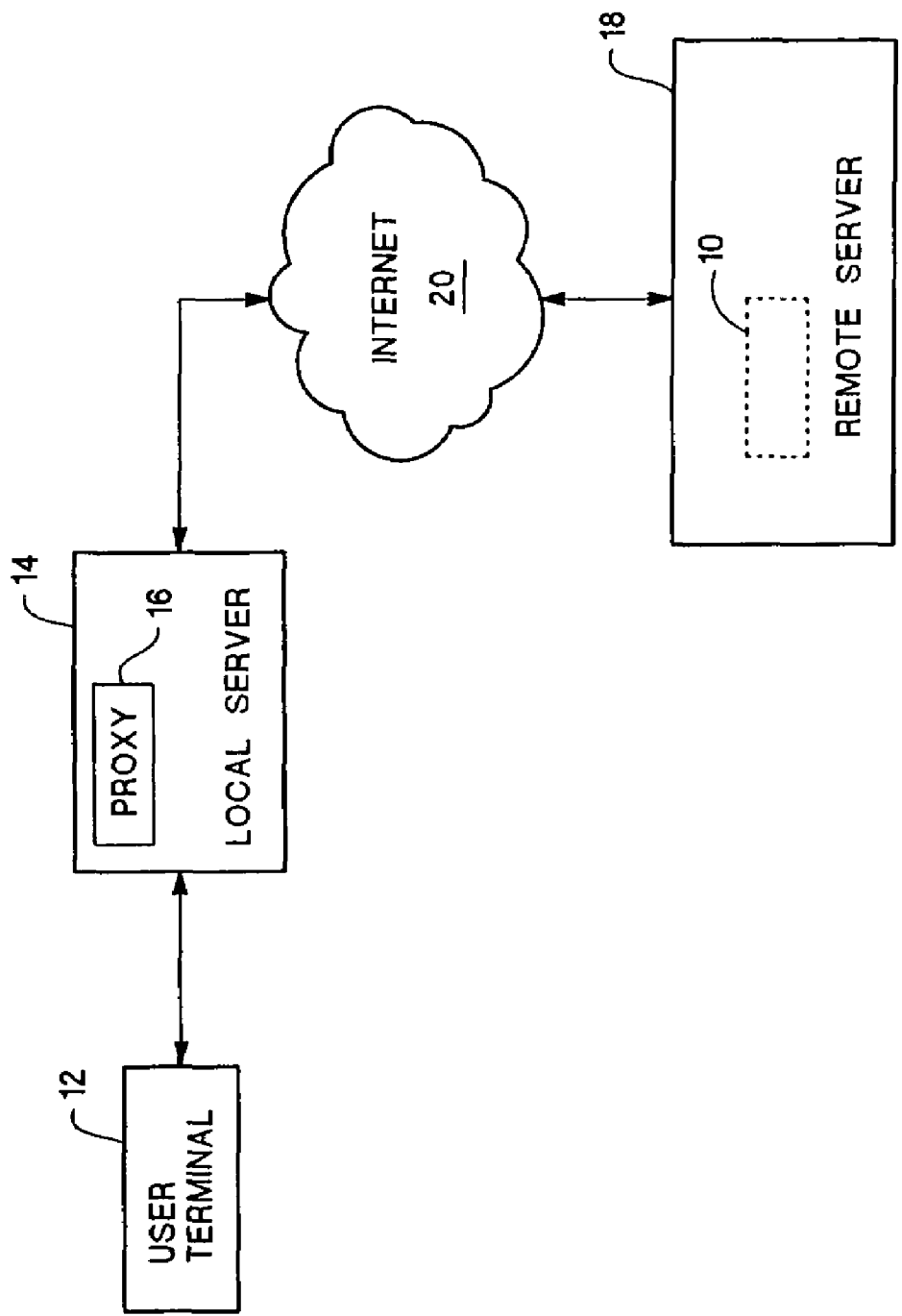
FIG. 1 shows a prior art data access network system without content consistency mechanism.
Figure 2:
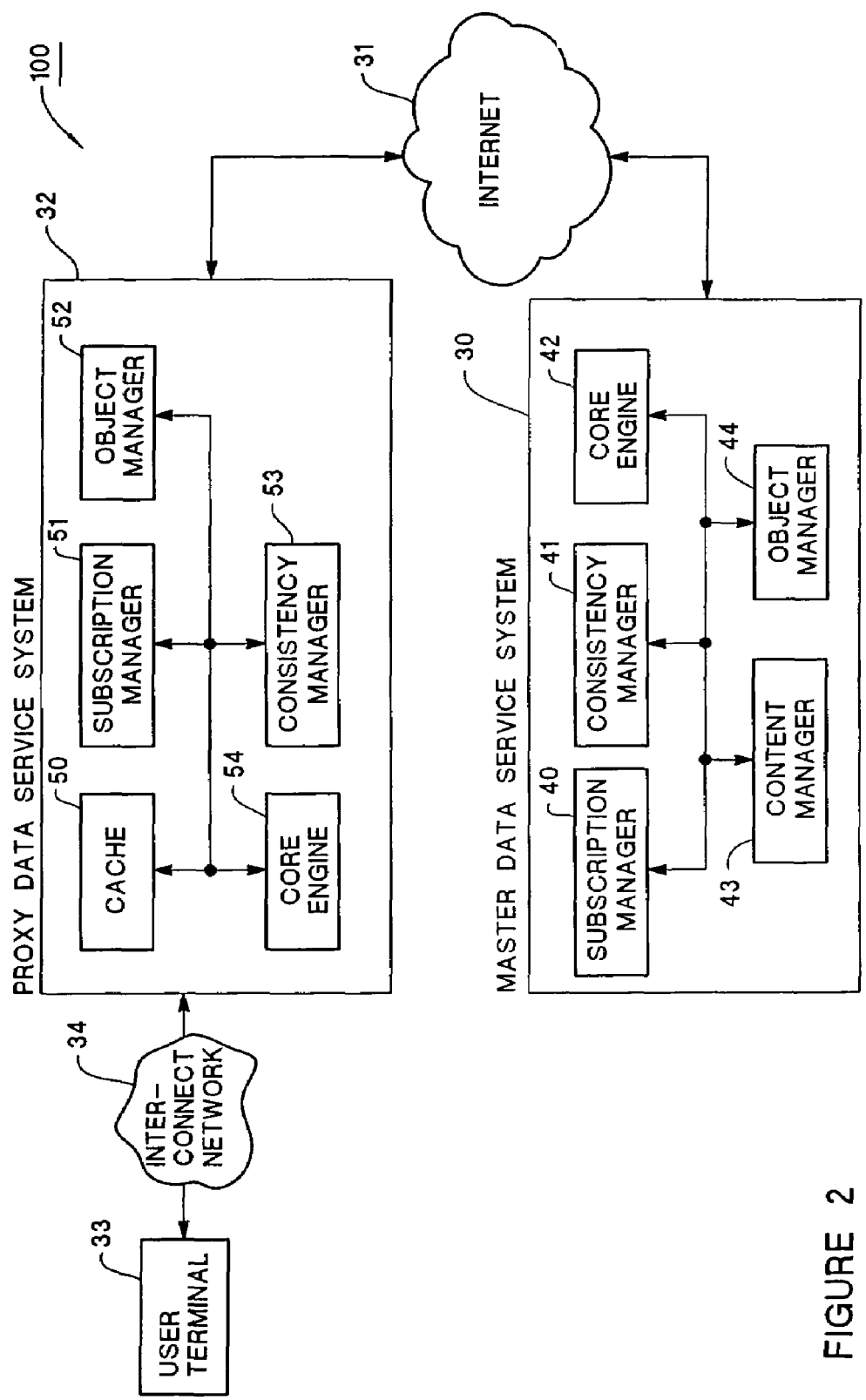
FIG. 2 schematically illustrates a data access network system having a content consistency mechanism in accordance with one embodiment of the present invention.

FIG. 2 shows the structure or configuration of a data access network system 100 that implements a content consistency scheme in accordance with one embodiment of the present invention. As will be described in more detail below, the content consistency scheme in accordance with one embodiment of the present invention employs a subscription manager (i.e., the subscription manager 40) in a data service system that contains content servers (i.e., the master data service system 30). The content servers in the master data service system 30 stores at least one content file, which can be accessed by remote proxy data service systems such as the proxy data service system 32. The subscription manager 40 in the master data service system 30 specifies all of the proxy servers (e.g., the proxy data service system 32) that consistently cache the content file and are subscribed to the cached content file. In addition, the content consistency scheme also employs a consistency manager (i.e., the consistency manager 41) to enforce the content consistency scheme. When the content of the content file is updated, deleted, or otherwise changed in the content servers of the master data service system 30, the consistency manager 41 notifies all of the proxy data service systems that cache and are subscribed to the content file to discard the cached content file.

Figure 3:
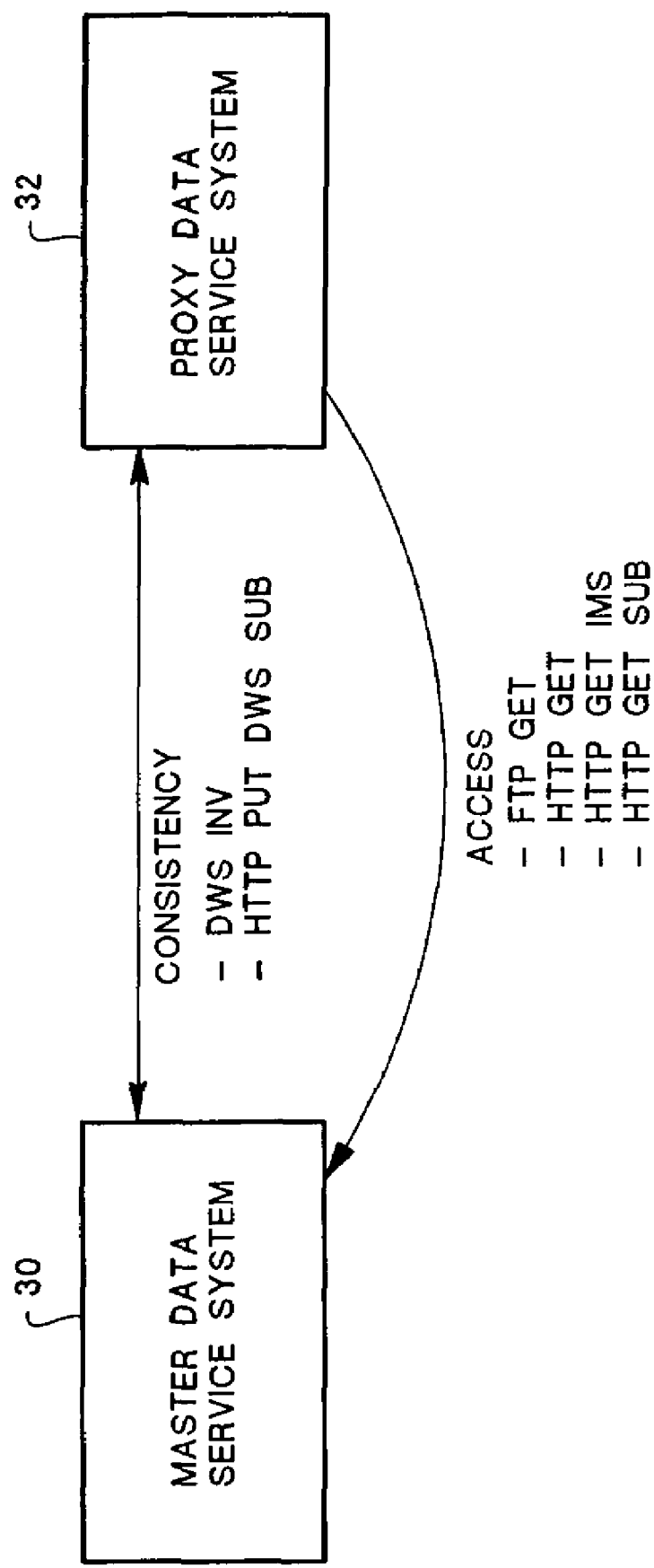
FIG. 3 shows various protocol request headers of the web cache consistency protocol used in the data access network system of FIG. 2 in accordance with one embodiment of the present invention.

In addition, each of the proxy data service systems also includes a subscription manager (e.g., the subscription manager 51). This subscription manager determines if content consistency is needed for the cached content file in the proxy data service system, and notifies the subscription manager 40 of the master data service system 30 if the content consistency (i.e., a subscription) is determined to be needed for the cached content file. Moreover, each of the proxy data service systems also includes a consistency manager (e.g., the consistency manager 53) that discards or replaces the cached content file upon receiving the notification from the consistency manager 41 of the master data service system 30. The content consistency scheme and the data access network system 100 will be described in more detail below, also in conjunction with FIGS. 2-4.

As can be seen from FIG. 2, the data access network system 100 is an open-ended distributed or federated network system. The structure of the data 1Q access network system 100 is described below in order to provide a foundation upon which the present invention can be described in more detail.

In one embodiment, the data access network system 100 is an Internet network system. In another embodiment, the data access network system 100 is an Intranet network system. Alternatively, the data access network system 100 may be any other known network system that employs a known communication protocol.

As can be seen from FIG. 2, the data access network system 100 includes the proxy data service system 32 and the master data service system 30 connected to the proxy data service system 32 via Internet (or Intranet) 31. As is known, the Internet 31 is a network system having a number of data service systems (similar to the data service systems 30 and 32) connected together via communication networks (not shown). Data communications among all data service systems are conducted using a predetermined communication protocol for Internet/Intranet communications. In one embodiment, the communication protocol is the Hyper Text Transport Protocol (HTTP). Alternatively, other known communication protocols for Internet/Intranet communications can also be used.

FIG. 2 only shows one proxy data service system 32 and one master data service system 30 for the data access network system 100. This is for illustration purposes only. In practice, the data access network system 100 includes a number of master and proxy data service systems. In addition, the master data service system 30 can also be connected to a number of proxy data service systems and the proxy data service system 32 can also be connected to a number of master data service systems. Moreover, the proxy data service system 32 can be both a proxy system and a master system in the data access network system 100. Likewise, the master data service system 30 can be both a master system and a proxy system in the data access network system 100. In this case, the master data service system 30 includes both the components 40-44 and the components 50-54 of the proxy data service system 32. The proxy data service system 32 may also include both the components 50-54 and the components 40-44 of the master data service system 30.

In FIG. 2, the proxy data service system 32 is connected to a user terminal 33 via an interconnect network 34. This means that the proxy data service system 32 serves as the gateway to the Internet 31 or the master data service system 30 for the user terminal 33. Again, FIG. 2 only shows one user terminal 33 for illustration purposes only. In practice, many more user terminals like the user terminal 33 can be connected to the proxy data service system 32.

The user at the user terminal 33 can access the proxy data service system 32 for the services provided by the data service system 32. The user at the user terminal 33 can also access the master data service system 30 for the services provided by the data service system 30 via the proxy data service system 32 and the Internet 31. In this case, the data service system 30 is the master system of the user terminal 33 and the data service system 32 is the proxy system of the user terminal 33. If the data service system 30 is also connected with a user terminal (not shown) and the user at that user terminal wants to access the proxy data service system 32 for the services provided by the data service system 32 via the master data service system 30 and the Internet 31, the data service system 30 becomes the proxy system for that user terminal and the data service system 32 becomes the master system for that user terminal. Thus, the terms "proxy" and "master" are relative terms, depending on the terminal referred to.

The data service system 32 will be referred to as the proxy data service system and the data service system 30 will be referred to as the master data service system below, with respect to the user terminal 33. In addition, the master data service system 30 can also be referred to as the content server system (or content server) and the proxy data service system 32 can also be referred to as the proxy server system (or proxy server).

The user terminal 33 may be located at a residence, a school, or an office of the user. The user terminal 33 includes a network access application program (e.g., a web browser application program such as Netscape's Navigator or Communicator) that allows the user to access the data services offered by the data service systems 30 and 32. The user terminal 33 can be a computer system or other electronic device with data processing capabilities (e.g., a web TV). The interconnect network 34 can be any known network, such as Ethernet, ISDN (Integrated Services Digital Network), T-1 or T-3 link, FDDI (Fiber Distributed Data Network), cable or wireless network or telephone line network.

Each of the data service systems 30 and 32 can be implemented in a computer system or other data processing system. The computer system that implements each of the data service systems 30 and 32 can be a server computer system, a workstation computer system, a personal computer system, or a mainframe computer system, a notebook computer system, or any other type of computer system.

As a master data service system, the data service system 30 includes a content storage 43 that serves to store content files of the data service system 30. In addition, the master data service system 30 includes a subscription manager 40, a consistency manager 41, a core engine 42, and an object manager 44. The components 40-44 are connected together. The components 42-44 implement servers that offer data services (e.g., web, news, advertisement, e-commerce, or e-mail) of the data service system 30. The servers include web servers, e-mail servers, news servers, e-commerce servers, domain name servers, address assignment servers, and advertisement servers. The web servers, e-mail servers, news servers, e-commerce servers, and advertisement servers can be collectively referred to as local service servers or content servers. A content server typically stores a number of content files that include Hyper-Text Markup Language (HTML) web pages, GWF and/or JPEG images, video clips, etc. The content servers support a variety of Internet applications to provide services such as access to the World Wide Web, electronic mail, bulletin boards, chat rooms, news groups, and e-commerce.

The content files are stored in the content storage 43 and are managed by the object manager 44. Data transfers to and from the content servers are enabled by transport protocols such as Transport Control Protocol (TCP) and the User Datagram Protocol (UDP). The core engine 42 performs all the data processing and transfer function of the data service system 30. The components 42-44 can be implemented using known technology.

The subscription manager 40 and the consistency manager 41 of the master data service system 30 are employed for maintaining the content consistency between the content files stored in the content storage 43 of the master data service system 30 and the same content files cached in the caches (e.g., the cache 50) of all the proxy data service systems (e.g., the proxy data service system 32) in accordance with one embodiment of the present invention. This will be described in more detail below. The function and structure of the subscription manager 40 and the consistency manager 41 will also be described in more detail below.

As a proxy system, the data service system 32 includes the cache 50 that serves to cache content files received in the proxy data service system 32. The content files cached in the cache 50 are received from, for example, the master data service system 30. In addition, the proxy data service system 32 includes the subscription manager 51, the consistency manager 53, a core engine 54, and an object manager 52. The components 50-54 are all connected together.

The components 50, 52, and 54 implement a number of functional servers that perform the data service functions of the proxy data service system 32. The servers include web servers, e-mail servers, news servers, e-commerce servers, domain name servers, address assignment servers, advertisement servers, and proxy servers. The servers support a variety of Internet applications. Using a currently commercially available web browser and other client applications, the users at their respective user terminals (e.g., the user terminal 33) can access the content files stored in the remote content servers (e.g., the content servers of the master data service system 30) via the proxy data service system 32.

Data transfers to and from the servers in the data service system 32 are enabled by transport protocols such as Transport Control Protocol (TCP) and the User Datagram Protocol (UDP). The core engine 54 performs all the data processing and transfer function of the data service system 32. The components 50, 52, and 54 can be implemented by known technology.

The data service functions provided by the components 50, 52, and 54 include the function of passing the access requests to the master data service system 30 (or to other data service systems), and the function of passing the requested content file from the master data service system 32 to the user terminal 33. In addition, the requested content file is also cached in the proxy servers of the proxy data service system 32 for future access. This eliminates the need for the core engine 54 in the proxy data service system 32 to send another request to the master data service system 30 for the same content file at a later time when a user terminal connected to the proxy data service system 32 requests for the same content file. Instead, the core engine 54 in the proxy data service system 32 can access the cache 50 and a "cache hit" results. In this case, the content file is quickly forwarded to the user terminal that requests the content file.

The subscription manager 51 and the consistency manager 53 of the proxy data service system 32 are employed for maintaining the content consistency between the content files stored in the master data service system 30 and the same content files cached in the caches (e.g., the cache 50) of all the proxy data service systems (e.g., the proxy data service system 32) in accordance with one embodiment of the present invention. This will be described in more detail below. The function and structure of the subscription manager 51 and the consistency manager 53 will also be described in more detail below.

As described above, the data access system 100 of FIG. 2 implements a content consistency scheme that maintains content consistency between the cached content file in the proxy data service system 32 and that stored in the content server of the master data service system 30. This content consistency scheme in accordance with one embodiment of the present invention is implemented through a publish/subscription mechanism which employs the subscription manager 40 and the consistency manager 41 in the master data service system 30 and the subscription manager 51 and the consistency manager 53 of the proxy data service system 32. In addition, a new communication protocol is employed, which will be described in more detail below, also in conjunction with FIG. 3.

Applying the content consistency scheme of the present invention, the content files cached in the proxy data service system 32 are guaranteed to be consistent with their counterparts stored in the remote master data service system 30 within a predetermined time interval. Assured consistency enables the proxy data service system 32 to serve the cached content files authoritatively, and reduces the need for consistency checking back to the origin content servers. This reduces the end user access latency and reduces load on the origin content servers because they do not have to serve consistency check requests. This also contributes to the improvement of the network bandwidth demand.

The new protocol for the content consistency scheme is built on the known HTTP protocol. As is known and as can be seen from FIG. 3, the HTTP protocol includes a set of requests. They are HTTP GET, HTTP PUT, and HTTP GET IMS (If-Modified-Since). The new content consistency protocol includes a set of header extensions to the HTTP protocol, in one embodiment. These extensions are (1) the SUB header extension to the HTTP GET request, (2) a DWS INV message, (3) a DWS SUB header extension to the HTTP PUT publish method (see FIGS. 3), and (4) a DWS lease header extension to the GET response.

The HTTP GET SUB request is used by the subscription manager 51 of the proxy data service system 32 to get a subscription in the master data service system 30 for the cached content file. The DWS INV message is sent by the consistency manager 41 of the master data service system 30 to all the proxy data service systems on the subscription list maintained by the subscription manager 40 of the master data service system 30 to discard the cached content file in the proxy data service systems. The consistency manager 41 sends the DWS INV message to all of the proxy data service systems specified in the subscription list maintained by the subscription manager 40 when the content file specified by the subscription list is updated or deleted by its content provider. The HTTP PUT DWS SUB method not only notifies all of the proxy data service systems on the subscription list to discard the cached content file, but also sends the updated content file to those proxy data service systems.

During operation, when the content file is retrieved from the master data service system 30 and cached in the proxy data service system 32, the subscription manager 51 first determines if the content consistency scheme need to be applied to the cached content file. This can be done by determining, for example, if the cached content file is a popular content file or not. If the content file is determined to be a popular one, the subscription manager 51 then sends a subscription request to the subscription manager 40 of the master data service system 30 using the HTTP GET SUB request if it is determined that the content consistency is required for the cached content file in the proxy data service system 32. As described above, content consistency means that if a content file stored in the content server of the master data service system 30 changes or is deleted, the proxy data service system 32 that caches the same content file should be notified of the change such that the proxy data service system 32 can either discard the cached content file or get the updated version of the cached content file.

When the subscription manager 40 of the data service system 30 receives the subscription request from the proxy data service system 32, the request is acknowledged and then may be added to a subscription list maintained by the subscription manager 40 in the master data service system 30 for the cached content file. The subscription list contains the return (notification) address of all the proxy data service systems that cache the content file.

Each subscription request must be acknowledged by the master data service system 30 in its HTTP reply. The master data service system 30 first makes its decision on whether to allow or grant a subscription for the subscription request based on local policy (which can include the object's global popularity estimate, its size, modification history, and number of existing subscriptions to that content file). The master data service system 30 returns an acknowledgment with the HTTP reply indicating if the subscription request is allowed, and if so, for how long.

The acknowledgment is in the form of a DWS-Lease response header field. Upon granting the subscription request, the subscription manager 40 of the master data service system 30 records the return (notification) address of the subscribing proxy data service system 32 within the meta-data of the cached content file in case it changes.

Each subscription granted by the subscription manager 40 of the master data service system 30 is bounded by a predetermined monitoring time interval. This means that the content consistency scheme only guarantee content consistency between the data service systems 30 and 32 within a prescribed time interval. The consistency manager 41 of the master data service system 30 will not generate an invalidation message upon modification or change to the cached content file after that predetermined monitoring time interval has elapsed.

The predetermined time interval can be set either statically or based on an estimate of the time of the next modification (i.e., modification history of the cached content file). Each cached content file may have a time interval associated with it. All subscribing proxy data service systems will share the same monitoring time interval. After the time interval has expired (assuming no modification has taken place), the subscription manager 40 clears the subscription list, with no communication required between the master and proxy data service systems 30 and 32. The time interval provides a simple and robust method for limiting the amount of state that must be kept by the master data service system 30. It also provides a network-efficient mechanism for the clean-up of the subscription list.

If the cached content file is modified or updated during the monitoring time interval, the subscription manager 40 transfers the subscription list to the consistency manager 41. The consistency manager 41 of the master data service system 30 then informs all the proxy data service systems currently listed on the subscription list to discard the cached content file. In this case, the consistency manager 41 sends a DWS INV message to each of the subscribing proxy data service systems contained in the subscription list. In addition, the consistency manager 41 can send the modified or updated content file to each of the subscribing proxy data service systems using the HTTP PUT DWS SUB publishing method. The consistency manager in each of the subscribing proxy data service systems (e.g., the consistency manager 53 of the proxy system 32) then either discards the cached content file or replaces it with the updated one just received from the master system 30.

When the consistency manager 41 sends a notification (with or without a modified content file) to the proxy systems, each delivery from the consistency manager 41 of the master data service system 30 needs to be acknowledged by the consistency manager of each proxy system (e.g., the consistency manager 53). If delivery fails, the consistency manager 41 will retry after a timeout, and repeat the retry periodically until successful or until the lease period expires, whichever is first. At that time, the consistency manager 41 will cease attempting to deliver the notification.

Delivery of the notification to the subscribing proxy systems is accomplished using one of two protocols, under the control of the consistency manager 41. The first protocol is the UDP protocol in which a notification message packet is sent to a notification port of the proxy system (e.g., the proxy system 32). This port is communicated to the master system 30 during proxy-to-master authentication, which must precede any subscription. The second protocol is the HTTP protocol. Using this protocol, an HTTP POST request is made to the HTTP notification port of the proxy system. The message body carries the change request. The change request may include change notification messages for one or more content files that have changed or been deleted. Sending many change notifications in one request reduces overall network utilization and delay.

Figure 4:
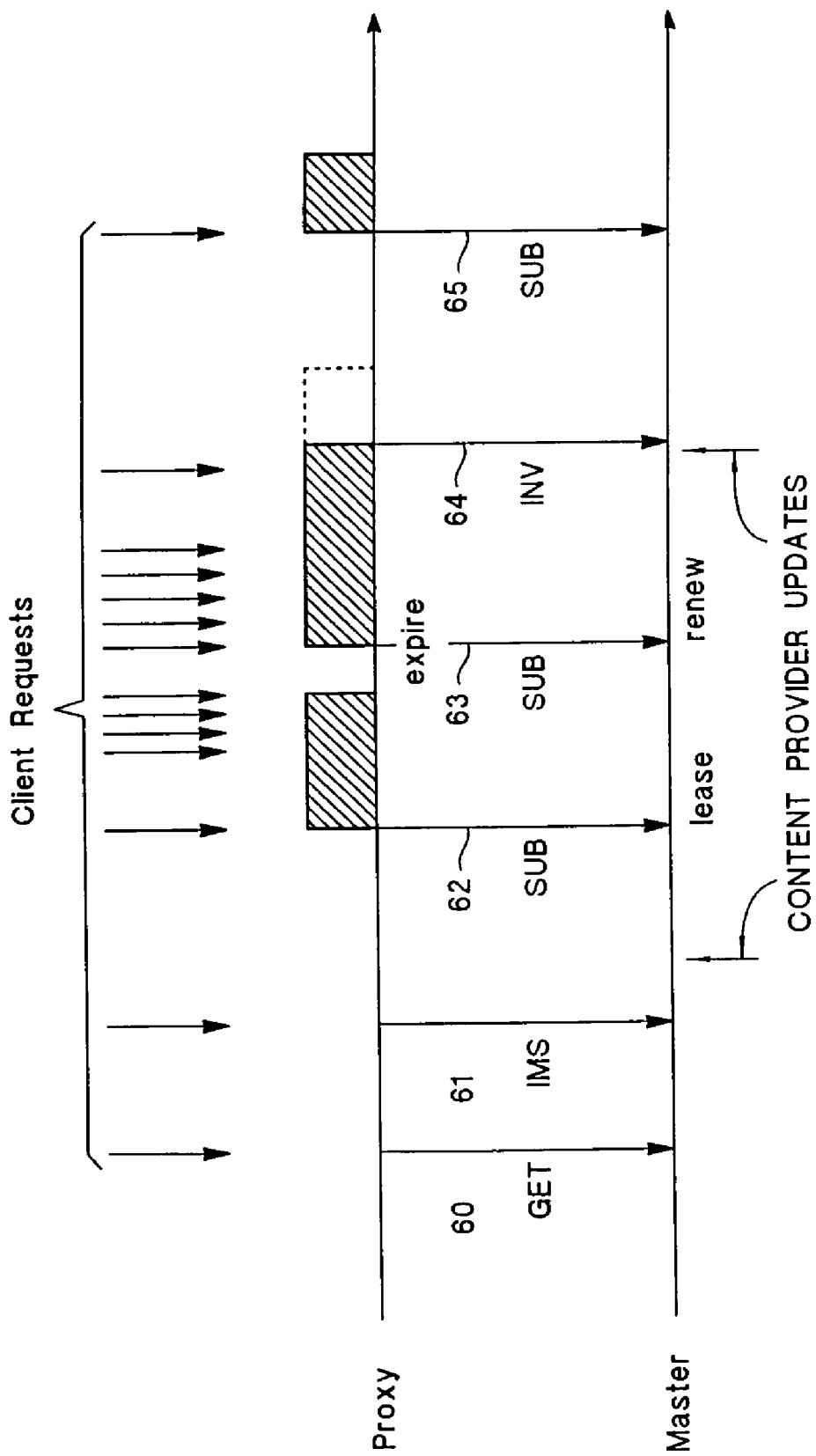
FIG. 4 shows the operation of the web cache consistency protocol of FIG. 3.

FIG. 4 depicts the interactions of the content consistency scheme in according to one embodiment of the present invention. The access request is from the user terminal 33 and is to be served by the proxy data service system 32. The proxy system 32 makes a HTTP GET request (e.g., the request 60 in FIG. 4) to get the first copy of the content file. On the next request, the proxy data service system 32 makes a HTTP GET IMS request (e.g., the request 61) to determine if the object has been modified (see FIG. 4). This is required because the proxy system 32 assures the user at the user terminal 33 and the original content servers at the master data service system 30 that the content files it serves are consistent with what the content provider has published. On that or a subsequent HTTP GET IMS request (e.g., the SUB request 62), the proxy data service system 32 may request a subscription to the cached content file. As a result and if the master system 30 approves the request, the proxy system 32 is given/receives a time interval indicating the lease period for that content file. The proxy system 32 then serves all user requests during the time interval directly from the cache 50 without external communication to the master data service system 30, as can be seen from FIG. 4.

After the lease interval elapses, the next user request for that cached content file causes the subscription manager 51 of the proxy system 30 to make another HTTP GET IMS request (e.g., the request 63) to the master system 30 for that content file. The request causes the proxy system 32 either to get an updated copy of the content file (if it has been modified after the lease period has expired), or to identify that it has not been updated or modified since the last retrieval. During this GET IMS request, the proxy system 32 may re-request a subscription to the content file, as shown in FIG. 4.

If the content file is deemed to be extremely popular, the proxy system 32 may request a subscription to the content file prior to the next user request (for example as soon as the prior lease interval expires). This is referred to as the active model. Using the passive model, the proxy system 32 only sends the subscription request when it receives the next user request for the cached content file.

If the content file is updated by the content provider in the master data service system 30 during the lease period, the consistency manager 41 of the master system 30 will detect the modification and will send a DWS INV message (e.g., the message 64) to all subscribing proxy systems, including the proxy system 32 (see FIG. 4). At that time, the subscription is cleared and no further invalidation message will be sent to the subscribing proxy systems for that content file unless a new subscription starts.

When the proxy system 32 receives a DWS INV message, the consistency manager 53 must annotate the meta-data of the content file such that it will not serve the cached content file again from the cache 50 when the content file is requested. This can include removing the content file from disk although this removal does not have to be synchronous with the request (it can be done at a quieter period or when disk space is next needed). Alternatively, the content file data can be maintained on disk and a delta encoding used to update the data when it is next requested. After an invalidation, the content file must not be served to the users because the content file may have been removed by its provider.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. In a data access network system that includes a content server coupled to a plurality of proxy servers via an interconnect network, a system of maintaining content consistency between the content server and proxy servers, comprising:
   a subscription manager in the content server for specifying all of the proxy servers that are subscribed to a content file stored in the content server, wherein the subscription manager generates a subscription list that specifies all of the subscribed proxy servers that cache the content file when the subscription manager is notified by each of the proxy servers that it has cached the content file; and
   a consistency manager also in the content server for notifying all of so subscribed proxy servers that cache the content file when the content file is updated in the content server to discard the cached content file from those proxy servers.

2. The system of claim 1, wherein a proxy server notifies the subscription manager that it has cached the content file via an HTTP GET request with a SUB (Subscription) header when the proxy server decides that the content file should be subscribed.

3. The system of claim 2, wherein if the proxy server decides that the content file is not a popular file, then that proxy sever does not notify the subscription manager that it has cached the content file.

4. The system of claim 1, wherein the consistency manager notifies each of the subscribed proxy servers via a DWS INV message when a content file has changed.

5. The system of claim 1, wherein the consistency manager also sends an updated content file to each of the proxy servers via an HTTP PUT request with a DWS SUB header.

6. The system of claim 1, wherein the consistency manager notifies all of the proxy servers specified by the subscription manager to discard the cached content file from the proxy severs when the content file is updated or deleted in the content sever within a predetermined time interval.

7. A content server, comprising:
   an engine configured to receive a content request from one or more proxy servers via a network, and configured to transmit a content corresponding to the content request to each of the one or more proxy servers that has made the content request via the network;
   a subscription manager configured to receive a subscription request, via the network, corresponding to the content from one or more of the one or more proxy servers that have made the content request, wherein the subscription request is a separate request from the content request, and the subscription manager is configured to generate a content subscription list, wherein the content subscription list is a list of one or more proxy servers that have subscribed to the content; and
   a consistency manager configured to notify, via the network, each proxy server in the content subscription list to discard the content from the proxy server when the content in the content server is modified or deleted.

8. The content server of claim 7, comprising a content storage configured to store the content.

9. The content server of claim 7,
   wherein the consistency manager is configured to notify each proxy server in the content subscription list to discard the content from the proxy server when the content in the content server is modified or deleted before a predetermined monitoring time interval corresponding to the content has elapsed, and
   wherein the predetermined monitoring time interval defines a time period that the content between the content server and the one or more proxy servers in the content subscription list are deemed to be consistent.

10. The content server of claim 9, wherein when a notification to a proxy server in the content subscription list is unsuccessful, the consistency manager is configured to repeat notification attempts to the proxy server until successful or until the predetermined monitoring interval elapses, whichever comes first.

11. The content server of claim 9, wherein the subscription manager is configured to notify each proxy server in the content subscription list regarding the predetermined monitoring time interval associated with the content.

12. The content server of claim 9, wherein the consistency manager is configured not to notify any of the proxy servers in the content subscription list when the content in the content server is modified or deleted after the predetermined monitoring time interval has elapsed.

13. The content server of claim 9, wherein the subscription manager is configured to clear the content subscription list after the predetermined monitoring time interval has elapsed.

14. The content server of claim 13, wherein the subscription manager is configured to clear the content subscription list after the predetermined monitoring time interval has elapsed without notifying any of the proxy servers in the content subscription list.

15. The content server of claim 9,
   wherein the content server has a plurality of contents, and
   wherein each of the plurality of contents has an associated predetermined monitoring time interval.

16. The content server of claim 9, wherein the subscription manager is configured to set the predetermined monitoring time interval to the content statically.

17. The content server of claim 9, wherein the subscription manager is configured to set the predetermined monitoring time interval to the content dynamically.

18. The content server of claim 17, wherein the subscription manager is configured to set the predetermined monitoring time interval to the content based on a modification history of the content.

19. The content server of claim 7,
   wherein the subscription manager is configured to decide whether to allow or grant a subscription for the subscription request based on a local policy, and configured to return an acknowledgment to the requesting proxy server indicating whether the subscription request is granted or not, and
   wherein the subscription manager is configured to add the requesting proxy server to the content subscription list when the subscription request is granted for the requesting proxy server.

20. The content server of claim 19, wherein when the subscription request is granted, the acknowledgment includes a predetermined monitoring time interval corresponding to the content, wherein the predetermined monitoring time interval defines a time period that the content between the content server and the one or more proxy servers in the content subscription list are deemed to be consistent.

21. The content server of claim 7, wherein the content request and the subscription request are received in a single message.

22. The content server of claim 7, wherein the content request and the subscription request are received in separate messages.

23. The content server of claim 7, wherein the subscription manager is configured to maintain the content subscription list in a global subscription list, wherein the global subscription list includes subscription information regarding a plurality of contents.

24. The content server of claim 7, wherein the subscription manager is configured to maintain a plurality of content subscription list, wherein each of the plurality of content subscription list corresponds to a particular content.

25. A proxy server, comprising:
   an engine configured to receive an access request for a content from a user terminal, configured to send a content request corresponding to the content to a content server via a network, configured to receive the content from content server, and configured to cache the content received from the content server in a cache storage;
   a subscription manager configured to send a subscription request, via the network, corresponding to the content to the content server, wherein the subscription request is a separate request from the content request; and
   a consistency manager configured to receive a notification, via the network, from the content server to modify or discard the content in the cache storage, and configured to modify or discard the content in the cache storage based on the notification from the content server.

26. The proxy server of claim 25, wherein the engine is configured to send the content request to the content server when the content is not cached in the cache storage.

27. The proxy server of claim 25, wherein the subscription manager is configured to determine whether or not a consistency scheme is necessary for the content, and configured to send the subscription request when it is determined that the consistency scheme is necessary and configured not to send the subscription request otherwise.

28. The proxy server of claim 27, wherein the subscription manager is configured to determine whether or not the consistency scheme is necessary for the content based on a popularity of the content.

29. The proxy server of claim 25,
   wherein the subscription manager is configured to receive a subscription acknowledgment from the content server after sending the subscription request,
   wherein the subscription acknowledgment includes a predetermined monitoring time interval corresponding to the content, and
   wherein the predetermined monitoring time interval defines a time period that the content between the proxy server and the content server are deemed to be consistent.

30. The proxy server of claim 29,
   wherein the subscription acknowledgement includes an indication of a grant or denial of the subscription request,
   wherein the predetermined monitoring time interval is included when the subscription request is granted, and
   wherein the subscription manager is configured to repeat the subscription request when the subscription request is denied.

31. The proxy server of claim 29, wherein the consistency manager is configured to modify or discard the content in the cache storage when the notification from the content server is received before the predetermined monitoring time interval elapses.

32. The proxy server of claim 29,
   wherein the subscription manager is configured to send a request-if-modified-since message to the content server for the content after the predetermined monitoring time interval elapses, and
   wherein the request-if-modified-since message is a message to inquire if the content has been modified or deleted in the content server since a last retrieval from the content server by the proxy server and to provide the modified content from the content server if the content in the content server has been modified.

33. The proxy server of claim 29, wherein the subscription manager is configured to resend the subscription request after the predetermined monitoring time interval has elapsed.

34. The proxy server of claim 33, wherein the subscription manager is configured to resend the subscription request when another access request for the content is received after the predetermined monitoring time has elapsed.

35. The proxy server of claim 33, wherein the subscription manager is configured to resend the subscription request after the predetermined monitoring time has elapsed and prior to receiving another access request for the content is received.

* * * * *

UNITED STATES PATENT AND TRADEMARK OFFICE
CERTIFICATE OF CORRECTION

PATENT NO.         : 7,349,902 B1                                         Page 1 of 1
APPLICATION NO. : 09/368635
DATED              : March 25, 2008
INVENTOR(S)        : Martin F. Arlitt et al.

It is certified that error appears in the above-identified patent and that said Letters Patent is hereby corrected as shown below:

In column 1, line 42, after "separate" delete "to".

In column 4, line 47, after "data" delete "1Q".

In column 6, line 24, delete "GWF" and insert -- GIF --, therefor.

In column 11, line 33, in Claim 5, delete "an" and insert -- the --, therefor.

In column 12, line 11, in Claim 11, delete "claim 9" and insert -- claim 10 --, therefor.

Signed and Sealed this

Twenty-ninth Day of July, 2008

JON W. DUDAS
*Director of the United States Patent and Trademark Office*